(12) United States Patent
Kerley

(10) Patent No.: US 7,431,902 B2
(45) Date of Patent: Oct. 7, 2008

(54) SEPARATION OF AMMONIA FROM SULFUR COMPOUNDS

(75) Inventor: Robert V. Kerley, Phoenix, AZ (US)

(73) Assignee: Sundance Resources Inc., Phoenix, AZ (US)

( * ) Notice: Subject to any disclaimer, the term of this patent is extended or adjusted under 35 U.S.C. 154(b) by 360 days.

(21) Appl. No.: 11/349,778

(22) Filed: Feb. 8, 2006

(65) Prior Publication Data

US 2007/0183953 A1  Aug. 9, 2007

(51) Int. Cl.
*C01C 1/02* (2006.01)
*C01D 13/00* (2006.01)

(52) U.S. Cl. .................. 423/23; 423/352; 423/356; 423/560; 423/566.2

(58) Field of Classification Search .................. 423/23, 423/352, 356, 560, 566.2
See application file for complete search history.

(56) References Cited

U.S. PATENT DOCUMENTS

| | | |
|---|---|---|
| 2,761,755 A | 9/1956 | Brown et al. |
| 3,097,926 A | 7/1963 | Nicklin et al. |
| 3,761,409 A | 9/1973 | McCoy et al. |
| 3,859,584 A | 1/1975 | Corry |
| 3,909,422 A | 9/1975 | Sample |
| 3,963,611 A | 6/1976 | Dardenne-Ankringa, Jr. |
| 4,002,727 A | 1/1977 | Sonoda et al. |
| 4,060,594 A | 11/1977 | Fenton et al. |
| 4,076,621 A | 2/1978 | Hardison |
| 4,083,945 A | 4/1978 | Fenton et al. |
| 4,315,903 A | 2/1982 | Fenton et al. |
| 4,400,361 A | 8/1983 | Shafer |
| 4,451,442 A | 5/1984 | Jeffrey et al. |
| 4,499,059 A | 2/1985 | Jones et al. |
| 5,993,667 A | 11/1999 | Overman |
| 6,149,883 A | 11/2000 | Ketcham et al. |
| 6,156,191 A | 12/2000 | Overman |
| 7,258,848 B1 * | 8/2007 | Blackwell et al. ............ 423/237 |
| 2003/0072707 A1 * | 4/2003 | Ray et al. .................... 423/514 |

* cited by examiner

*Primary Examiner*—Timothy C Vanoy
(74) *Attorney, Agent, or Firm*—Venable, Campillo, Logan & Meaney PC

(57) ABSTRACT

A method for separating ammonia and sulfides from a sour water stream is disclosed. The stripping of a sour water stream where it is stripped to create a sour water stripper overhead gas and then contacted with an alkali hydroxide in order to separate ammonia and make an alkali sulfide.

25 Claims, 2 Drawing Sheets

SEPARATION OF AMMONIA FROM SULFUR COMPOUNDS

FIELD OF THE INVENTION

The present invention relates to the field of separating ammonia from sulfur containing waste products such as sour water, and more specifically separating ammonia and hydrosulfide from ammonia hydrosulfide found in sour water such that the hydrosulfide may be used in other processes such as mineral extraction, paper pulping, leather tanning, etc.

BACKGROUND

The use of sodium hydrosulfide (NaSH) to separate copper and molybdenum was discovered and developed by Kerley Industries in the 1960's. Typically, NaSH has been used as a liquid solution containing 20%-45% NaSH in a liquid solution as a depressant and sulfidizing agent by the mineral recovery industry. Typical commercial high grade NaSH solutions are made by combining hydrogen sulfide with caustic soda as shown in the following reaction:

$$H_2S + NaOH \rightarrow NaHS + H_2O \tag{1}$$

Sodium hydrosulfide is a dangerous chemical and is also used in the pulp and paper industries, the leather-tanning industries and as a raw material or purifying agent in manufacturing.

It is well known that a number of processes used in refining petroleum produce water containing sulfur and nitrogen containing compounds. These waters are typically called sour water or foul water. Sour water producing processes include; for example, crude distillation, hydrotreating, catalytic cracking, thermal cracking, delayed coking and hydrocracking. Ammonia hydrosulfide or ammonia sulfide are usually present in sour water either because ammonia has been added to neutralize hydrogen sulfide or as a result of the hydrogenation of nitrogen during the refining process depending on the pH of the water and the amount of sulfur present. Typically, refinery sour water has a pH of 9.0 and ammonia hydrosulfide is present.

Because crude oil contains sulfur, modern oil refineries treat the sulfur containing fractions of crude oil with hydrogen in a process called hydrotreating and/or hydrocracking in order to meet the environmental standards of sulfur content of petroleum fuels. During the refining process, the sulfur and nitrogen in the crude oil is converted to hydrogen sulfide (a gas) and ammonia (a gas) that react with each other and form water soluble solids that must be washed out of all fractions of crude oil derivatives produced in a standard oil refinery. This washing of the crude oil products produces a high volume of sour water, foul smelling wash water typically containing 1%-2% ammonium hydrosulfide ($NH_4HS$).

For reasons related in particular to the environment, the sour water containing ammonium hydrosulfide ($NH_4HS$) cannot be released without further treatment. To reduce the disposal problem of the sour water and recover large amounts of water for further use as wash water the dilute "sour water" is stripped with heat. Generally the stripping process uses a hot gas stream that forces ammonium hydrosulfide ($NH_4HS$) solution into the gas phase as hydrogen sulfide, ammonia and water for further treatment in a sulfur recovery unit such as a Claus unit. Typically the stripping process of refinery sour water streams uses steam to liberate more hydrogen sulfide but is complicated by the added presence of ammonia and other chemicals. A typical Sour Water Stripper Overhead Gas ("SWS Gas") has a temperature of typically 185 to 200° F. and the approximate average analysis of 25% $NH_3$, 49% $H_2S$, and 26% $H_2O$ (water), weight %.

SWS Gas is a hazardous, deadly and dangerous to handle gas—it gives off a very deadly $H_2S$ gas vapor. Hydrogen Sulfide ($H_2S$) is a very deadly gas and is produced in very large quantities today by the petroleum industry. However, due to the $H_2S$ being a deadly gas, and even though $H_2S$ is an unavoidable and unwanted by-product, and costly to get rid of, the $H_2S$ by-product producers are highly reluctant to depend on a third party to take responsibility of disposal due to handling and safety issues.

Information relevant to these issues can be found in the following U.S. Pat. Nos.: 2,761,755, 3,097,926, 3,761,409, 3,859,584, 3,909,422, 4,002,727, 4,060,594, 4,083,945, 4,315,903, 4,400,361, 4,451,442, 4,499,059, 5,993,667, 6,156,191 each of these US Patents are hereby incorporated herein by reference.

The practice in most oil refineries is to dispose of the SWS Gas as fast and as soon as it leaves the sour water stripper column. This is accomplished by feeding it, as produced, into a standard Claus Sulfur Recovery Unit ("SRU") operating, at approximately 2,600° F., where it decomposes and transforms into elemental sulfur, and non-hazardous steam and nitrogen. A typical SRU costs approximately one hundred forty million dollars installed. While these costs are high, but generally accepted as the best available technology, due to environmental and safety concerns and the refiners need to dispose of the SWS Gas, producing other products from the SWS Gas is not currently thought of as an acceptable alternative.

Because ammonia gas is a valuable and basic ingredient in all plant food and because sulfides can be used in the mining and other industries, it would be highly advantageous to reclaim ammonia and other usable sulfide products from refinery waste streams such as sour water streams. Specifically, it would be also advantageous in the disposal and use of SWS Gas that the products produced therefrom find immediate, valuable use and are environmentally safe, as this invention allows. The hazardous nature of the SWS Gas is drastically reduced as soon as it enters the process covered by this invention and valuable ammonia is salvaged with the value adding to the economics of this process of producing high quality, high analyses NaHS.

The SWS Gas waste product that this invention removes from a modern petroleum refinery became a serious problem to the petroleum refiners approximately twenty (20) years ago as a result of the world's need to lower the sulfur content of petroleum products. In their attempt to comply with the lower sulfur specifications in their products, the industry has invested well into the billions of dollars in facilities and millions of dollars in operating costs to operate them. Not a single refinery has come up with the process, the subject of this invention, all the while choking over the problem. This is especially true of the mid-size to small refineries.

SUMMARY

It is an object of the present invention to provide a method of separating a sour water stream containing ammonia and sulfides that has been concentrated by stripping the dilute, as produced, sour water stream to create a more concentrated SWS Gas, and then contacting the SWS Gas with an alkali hydroxide in order to separate ammonia and make an alkali sulfide.

It is another object of the present invention to provide a method of disposing of a sour water stream by stripping the sour water stream to create SWS Gas, then contacting the SWS Gas with an alkali hydroxide in order to separate ammonia and make an alkali sulfide, and then using the alkali sulfide produced thereby in the copper/molybdenum recovery industry or any other industry where high quality, high analysis sulfide solutions are used. Preferably, stripping the sour water stream uses a hot gas stream, and more preferably, the hot gas stream is steam. Normally, stripping the sour water stream creates an SWS Gas having a temperature of at least 180° F. Also preferably, the alkali hydroxide is selected from the group consisting of sodium hydroxide and potassium hydroxide; and, wherein the alkali hydrosulfide is selected from the group consisting of sodium hydrosulfide and potassium hydrosulfide.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

Figure 1:
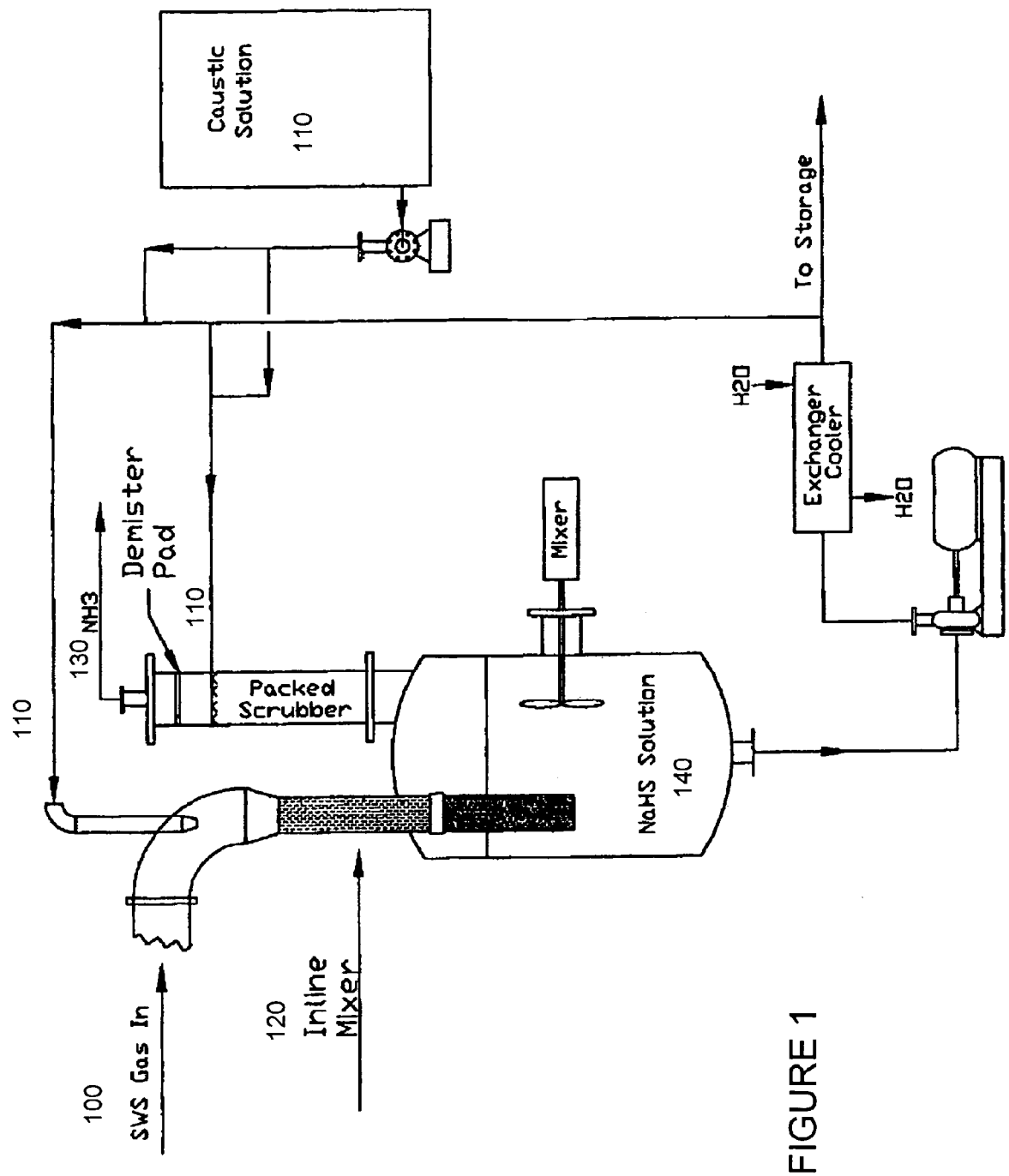
FIG. 1 is a process flow diagram of a first embodiment of the invention.

One preferred embodiment of the process for separating ammonia and sulfides from refinery sour water streams includes: stripping the sour water stream to create SWS Gas, and then contacting the SWS Gas with an alkali hydroxide in order to separate ammonia and make an alkali sulfide. Preferably, stripping the sour water stream using a hot gas stream, and more preferably, the hot gas stream is steam. Preferably, stripping the sour water stream (also called "sour water") creates an SWS Gas having a temperature of at least 180° F. Also preferably, the alkali hydroxide is selected from the group consisting of sodium hydroxide and potassium hydroxide and wherein the alkali hydrosulfide is selected from the group consisting of sodium hydrosulfide and potassium hydrosulfide. While not completely known, it is believed that the following equation may describe one or more portions of the invention:

$$NH_4HS + NaOH \rightarrow NaHS + H_2O + NH_3 g\uparrow \qquad (2)$$

While not completely or definitely established, it is believed that a standard practice in most petroleum refineries is that the dilute sour water stream is heated and stripped to produce an SWS Gas, having the approximate analysis, by volume, of 33% $H_2S$, 33% $NH_3$, and 33% $H_2O$ when heated and stripped at a temperature range of approximately 180 to 200° F. It is commonly believed that some, if not all, of the SWS Gas under these conditions actually exists as a disassociated ammonia compound $NH_3HS$ in solution into $NH_3$ gas, $H_2S$ gas and $H_2O$ vapor. Accordingly it is believed that the following equations may relate to one or more portions of the invention:

Basic Chemical Reaction

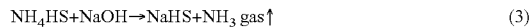

$$NH_4HS + NaOH \rightarrow NaHS + NH_3 \text{ gas}\uparrow \qquad (3)$$

With Hot SWS Gas

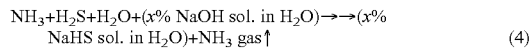

$$NH_3 + H_2S + H_2O + (x\% \text{ NaOH sol. in } H_2O) \rightarrow \rightarrow (x\% \text{ NaHS sol. in } H_2O) + NH_3 \text{ gas}\uparrow \qquad (4)$$

Because the sources of the sour wash streams can vary as the sources and procedures of concentrating them can vary, it is believed that the SWS Gas can vary as to amount of (the ratios of) the $H_2S$, $NH_3$, and $H_2O$ such that more $(NH_4)_2$ could be present in some sour wash streams and the SWS Gas contain more $H_2O$.

In a typical refinery sour water stripper, the sour water is first collected in a flash drum designed to remove any hydrocarbons, gases and liquids. Flashing the sour water is accomplished though lowering the pressure to volatize and separate hydrocarbons such that any liquid hydrocarbon can be decanted. The flashed liquid is then typically fed to another separation tank to remove more hydrocarbons.

The flashed/separated sour water is then typically heated and fed to the top of a stripper column where it contacts steam or air in counter flow so that the dissolved gases can be removed. Usually, a reboiler is used to limit water consumption. Alternatively, steam could be injected into the column. Generally, the SWS Gas is cooled near the top of the stripper column to typically 185 to 200° F. Typically, SWS Gas stripping requires that the sulfides and ammonia are both present in the gaseous form. Usually this presents a problem because the ideal pH for hydrogen sulfide stripping is below 5, since above 5 the sulfide is found as $HS^-$ or $S^{2-}$ ions depending on the amount of sulfur in the system. On the other hand, stripping of ammonia typically requires a pH above 10 so that $NH_4^+$ ions are not produced. In typical sour water stripper the pH is set at 8 for economical extraction. In the present invention, however, the pH may be higher (10 or above) since any $HS^-$ or $S^{2-}$ ions will react with alkali metal hydroxide such as sodium hydroxide or potassium hydroxide to form an alkali metal hydrosulfide such as sodium hydrosulfide or potassium hydrosulfide and liberate ammonia ($NH_3$).

In a preferred embodiment, the SWS Gas is then contacted in a known reactor or column with a sodium hydroxide solution and cooled such that a NaSH solution in water having a wt. percent between 40 and 43 is produced. The ammonia may either be collected as a gas or liquefied with cooling and under pressure.

Figure 2:
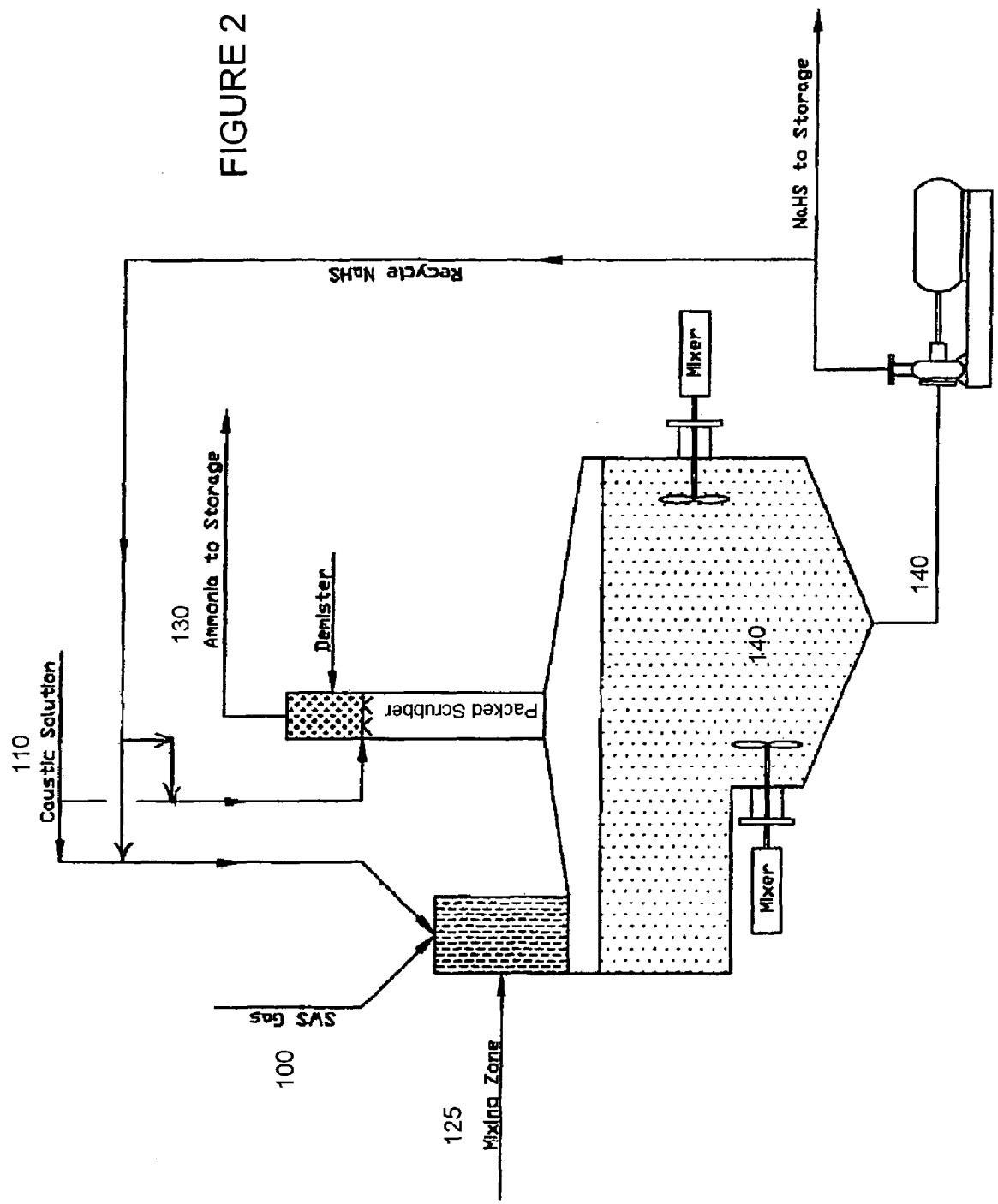
FIG. 2 is a process flow diagram of a second embodiment of the invention.

FIGS. 1 and 2 show two preferred embodiments for separation of ammonia and NaSH of the invention. These preferred embodiments are not intended as the only recommended design of how to use the process subject of this invention; they are only examples of many ways to possibly design a process to use the invention; however, it is possible that there could be as many successful designs, all different in major to minor ways, all successful in regard to performing the fundamental process of this invention. The most preferred embodiment of this invention is to have the best possible and complete contact and mixing of the NaOH solution (sometimes called "a caustic solution") and SWS Gas in such a way that in the reaction between the SWS Gas and the NaOH solution is sufficient to allow effective contact to permit reaction to take place such that the ammonia released in the reaction can be separated as fast and completely as it is freed by the NaOH solution.

In the preferred embodiment shown in FIG. 1, SWS Gas 100 contacts an NaOH solution 110 in an inline mixer 120 which is then mixed in a mixing vessel to separate the ammonia 130 as a gas and NaSH as an aqueous solution 140. In this preferred embodiment, the NaHS solution 140 is then pumped though a heat exchanger and stored or recycled.

In the preferred embodiment shown in FIG. 2, NaOH solution 110 contacts SWS Gas 100 in a mixing zone 125 which is then mixed in a mixing vessel to separate the ammonia 130 as a gas and NaSH as an aqueous solution 140. In this preferred embodiment, the ammonia 130 liberated from the reaction is also contacted with NaOH solution 110 to ensure that the ammonia is scrubbed of any residual sulfides. In this preferred embodiment, the NaHS solution 140 is then pumped and stored or recycled.

Preferably, the weight percent of the NaOH solution is between 20 and 70 weight percent and more preferably between 40 and 60 weight percent. Preferably, the NaSH has a weight percent above 30 weight percent and more preferably within 40 to 50 weight percent. The preferred pH of the SWS Gas in contact with the NaOH is above 5, more preferably above 8 and most preferably above 10.

This NaHS solution, as produced by the process subject of this invention, can be used where ever high quality, high analysis NaHS is preferred, such as the minerals recovery industry as a depressant or a sulfurdizer, in leather tanning as a depilatory, in the production of paper pulp in the paper industry, a metals precipitator in waste water disposal, etc.

The NaSH solution is then used in numerous industries such as mining for separating copper and molybdenum sulfide. Specifically, NaSH solution is used in the flotation process, that is to separate the copper concentrate from the molybdenum concentrate before smelting.

Use of NaHS Solution in Copper/Moly Recovery

Molybdenum and copper in many mines are found together. Molybdenum sulfide floats easily, in some cases, only with an oil as the collector. This feature results in it floating well with any collectors that float copper sulfide; and, therefore, at the mines where they are together in the ores, molybdenum sulfide floats out with the copper sulfide concentrate. Copper sulfide requires a stronger collector so the easily floated molybdenum comes out with it. Without separation, the molybdenum concentrate goes with the copper concentrate to the copper smelter where it is lost permanently.

Since there is a fundamental difference in the two in the way molybdenum sulfide and copper sulfide separate in float cells, several steps are taken to accentuate this difference, the most important of which is float dewatering (thickening) and then the addition of NaHS to the combined float. The addition of NaHS depresses the copper sulfide in the total float and causes it to drop out and go to the bottom of the float cell leaving the molybdenum sulfide such that it can be removed and processed to liberate the molybdenum. The copper sulfide concentrate that has settled out, is then recovered and sent to the smelter.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method of separating a sour water stream containing ammonia and sulfides comprising the steps of:
   Stripping the sour water stream to create an SWS Gas, and
   Contacting the SWS Gas with an alkali hydroxide in order to separate ammonia and make an alkali hydrosulfide.

2. The method of claim 1 wherein the step of stripping the sour water stream uses a hot gas stream.

3. The method of claim 2 wherein the hot gas stream is steam.

4. The method of claims 2 or 3 wherein the step of stripping the sour water stream creates a sour water stripper overhead gas having a temperature of at least 180° F.

5. The method of claims 2 or 3 wherein the alkali hydroxide is selected from the group consisting of sodium hydroxide and potassium hydroxide and wherein the alkali hydrosulfide is selected from the group consisting of sodium hydrosulfide and potassium hydrosulfide.

6. The method of claim 1 wherein the alkali hydrosulfide is a high quality sodium hydrosulfide chemical product (NaHS), and if desired, a high analysis NaHS product for use and sale where high quality and/or high analysis is desired or requested.

7. A method of disposing of a sour water stream comprising the steps of:
   Stripping a sour water stream to create an SWS Gas,
   Contacting the SWS Gas with an alkali hydroxide in order to separate ammonia and make an alkali hydrosulfide, and
   Using the alkali hydrosulfide in a mining process.

8. The method of claim 7 wherein the step of stripping the sour water stream uses a hot gas stream.

9. The method of claim 8 wherein the hot gas stream is steam.

10. The method of claims 8 or 9 wherein the step of stripping the sour water stream creates a SWS Gas having a temperature of at least 180° F.

11. The method of claims 8 or 9 wherein the alkali hydroxide is selected form the group consisting of sodium hydroxide and potassium hydroxide.

12. A method to produce a copper concentrate depressant (separator) from a molybdenum concentrate from ore comprising the steps of:
   Stripping a sour water stream to create an SWS Gas,
   Contacting the SWS Gas with an alkali hydroxide in order to separate ammonia and make an alkali hydrosulfide, and
   Using the alkali hydrosulfide to separate copper concentrate from molybdenum concentrate from ore.

13. The method of claim 12 wherein the step of stripping the sour water stream uses a hot gas stream.

14. The method of claim 13 wherein the hot gas stream is steam.

15. The method of claims 13 or 14 wherein the step of stripping the sour water stream creates and SWS Gas having a temperature of at least 180° F.

16. The method of claims 13 or 14 wherein the alkali hydroxide is selected form the group consisting of sodium hydroxide and potassium hydroxide.

17. A method of separating a SWS gas containing ammonia and sulfides comprising the step of: contacting the SWS Gas with an alkali hydroxide in order to separate ammonia and make an alkali hydrosulfide.

18. The method of claim 17 wherein the alkali hydroxide is selected form the group consisting of sodium hydroxide and potassium hydroxide.

19. The method of claim 18 wherein the alkali hydrosulfide is in an aqueous solution.

20. The method of claim 17 wherein the ammonia is separated as a gas.

21. The method of claim 20 further comprising the step of liquefying the ammonia under pressure.

22. A method to produce a copper concentrate depressant (separator) from a molybdenum concentrate from ore using SWS Gas comprising the steps of:
   Contacting the SWS Gas with an alkali hydroxide in order to separate ammonia and make an alkali hydrosulfide, and
   Contacting the alkali hydrosulfide with molybdenum concentrate from ore to separate copper concentrate.

23. The method of claim 22 wherein the alkali hydrosulfide is an aqueous solution.

24. The method of claim 23 wherein the alkali hydrosulfide in the aqueous solution has a weight percent between 20 and 70 percent.

25. A method of disposing of a SWS gas comprising the steps of:
   contacting the SWS Gas with an alkali hydroxide in order to separate ammonia and make an alkali hydrosulfide, and
   using the alkali hydrosulfide in a mining process or for other applications requiring a high quality, high analysis NaHS and using the ammonia in industrial applications.

* * * * *